(12) United States Patent
Walther

(10) Patent No.: US 9,176,166 B2
(45) Date of Patent: Nov. 3, 2015

(54) MICRO/NANO MULTIAXIAL INERTIAL SENSOR OF MOVEMENTS

(71) Applicant: COMMISSARIAT A L'ENERGIE ATOMIQUE ET AUX ENE ALT, Paris (FR)

(72) Inventor: Arnaud Walther, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 209 days.

(21) Appl. No.: 13/722,427

(22) Filed: Dec. 20, 2012

(65) Prior Publication Data

US 2014/0060184 A1  Mar. 6, 2014

(30) Foreign Application Priority Data

Dec. 22, 2011 (FR) .................................. 11 62248

(51) Int. Cl.
| | |
|---|---|
| *G01C 19/02* | (2006.01) |
| *G01P 15/097* | (2006.01) |
| *G01P 3/00* | (2006.01) |
| *G01P 15/14* | (2013.01) |

(Continued)

(52) U.S. Cl.
CPC ............ *G01P 15/14* (2013.01); *G01C 19/5712* (2013.01); *G01P 15/097* (2013.01); *G01P 15/123* (2013.01); *G01P 15/18* (2013.01)

(58) Field of Classification Search
CPC .... G01C 19/5719; G01C 19/56; G01P 15/14; G01P 15/18
USPC .......................... 73/504.13–504.14, 774, 767, 73/504.02–504.03, 504.12
See application file for complete search history.

(56) References Cited

U.S. PATENT DOCUMENTS 5,955,668 A * 9/1999 Hsu et al. .................... 73/504.12
6,158,280 A * 12/2000 Nonomura et al. ........ 73/504.04

(Continued)

FOREIGN PATENT DOCUMENTS

DE  10 2007 054 505 A1  5/2009
EP        1 762 823 A2  3/2007

(Continued)

OTHER PUBLICATIONS

European Search Report issued Apr. 26, 2013 in Patent Application No. 12198466.0 (with English translation of category of cited documents).

(Continued)

*Primary Examiner* — Eric S McCall
*Assistant Examiner* — Anthony W Megna Fuentes
(74) *Attorney, Agent, or Firm* — Oblon, McClelland, Maier & Neustadt, L.L.P.

(57) ABSTRACT

The multiaxial inertial sensor of movements is a micro/nano sensor that makes it possible to couple at least one accelerometer with other structures, either accelerometers or gyroscopes, by an oscillating disk structure. The oscillating disk also forms an inertial sensor such as a gyrometer. This single-chip structure associating both gyroscopes and accelerometers makes it possible to achieve detections and measurements in up to 6 axes, in other words 3 accelerometer axes and 3 gyroscope axes, and to exert control by a single and unique electronic unit, thus permitting a single automatic control loop in excitation and a single electronic reading chip. Application to technologies known as MEMS.

16 Claims, 10 Drawing Sheets

(51) Int. Cl.
*G01C 19/5712* (2012.01)
*G01P 15/12* (2006.01)
*G01P 15/18* (2013.01)

(56) References Cited

U.S. PATENT DOCUMENTS

| | | | |
|---|---|---|---|
| 2003/0131664 A1* | 7/2003 | Mochida et al. | 73/504.12 |
| 2003/0216884 A1 | 11/2003 | Cardarelli | |
| 2007/0062282 A1 | 3/2007 | Akashi et al. | |
| 2009/0260437 A1 | 10/2009 | Blomqvist | |
| 2010/0126269 A1 | 5/2010 | Coronato et al. | |
| 2010/0132463 A1 | 6/2010 | Caminada et al. | |
| 2010/0223996 A1* | 9/2010 | Fukumoto | 73/504.12 |
| 2010/0294039 A1* | 11/2010 | Geen | 73/504.12 |
| 2011/0023600 A1 | 2/2011 | Wrede et al. | |
| 2011/0154898 A1* | 6/2011 | Cazzaniga et al. | 73/504.12 |
| 2011/0219875 A1 | 9/2011 | Walther et al. | |
| 2012/0006123 A1* | 1/2012 | Walther et al. | 73/774 |
| 2012/0060604 A1* | 3/2012 | Neul et al. | 73/504.12 |

FOREIGN PATENT DOCUMENTS

| | | | |
|---|---|---|---|
| EP | 2 192 382 A1 | 6/2010 | |
| EP | 2 339 293 A1 | 6/2011 | |
| FR | 2 948 460 A1 | 1/2011 | |
| FR | 2 957 414 A1 | 9/2011 | |
| FR | 2 962 532 A1 | 1/2012 | |

OTHER PUBLICATIONS

French Preliminary Search Report and Written Opinion issued Oct. 4, 2012 in corresponding French Application No. 11 62248 filed on Dec. 22, 2011 (with an English Translation of Categories).

Ranjith Amarasinghe et al., "Development of miniaturized 6-axis accelerometer utilizing piezoresistive sensing elements", Sensors and Actuators A, vol. 134, 2007, pp. 310-320.

Yoshiyuki Watanabe et al., "Five-axis motion sensor with electrostatic drive and capacitive detection fabricated by silicon bulk micromachining", Sensors and Actuators A, vol. 97-98, 2002, pp. 109-115.

Yoshiyuki Watanabe et al., "SOI micromachined 5-axis motion sensor using resonant electrostatic drive and non-resonant capacitive detection mode", Sensors and Actuators A, vol. 130-131, 2006, pp. 116-123.

Takao Murakoshi et al., "Electrostatically Levitated Ring-Shaped Rotational-Gyro/Accelerometer", Japanese Journal of Applied Physics, vol. 42, 2003, pp. 2468-2472 (Submitting English Summary Only).

Nan-Chyuan Tsai et al., "Fabrication and analysis of a micro-machined tri-axis gyroscope", Journal of Micromechanics and Microengineering, vol. 18, No. 115014, 2008, pp. 1-14.

\* cited by examiner

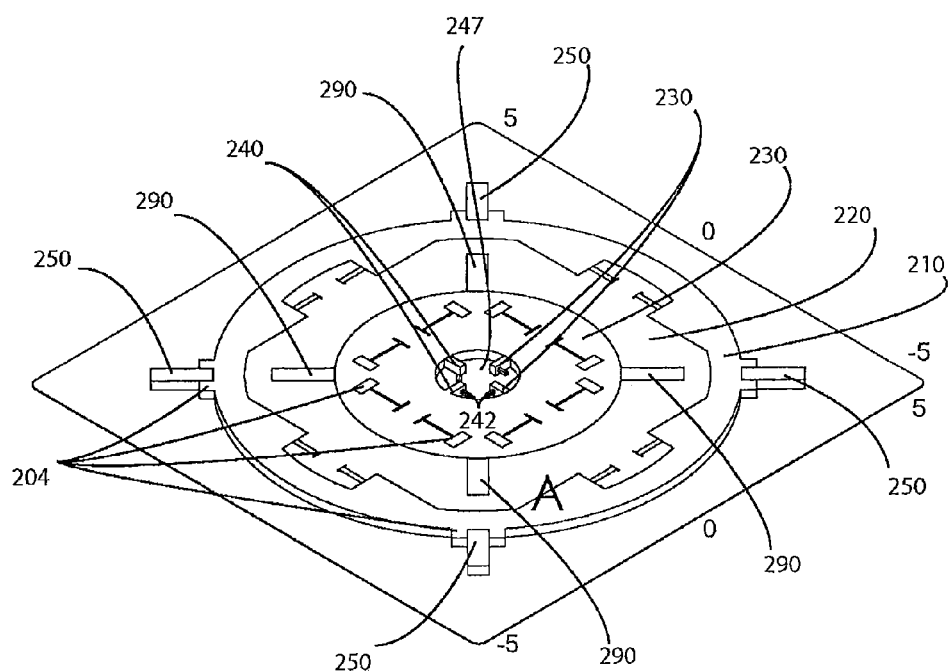
FIG. 2
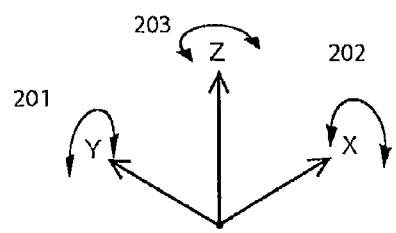

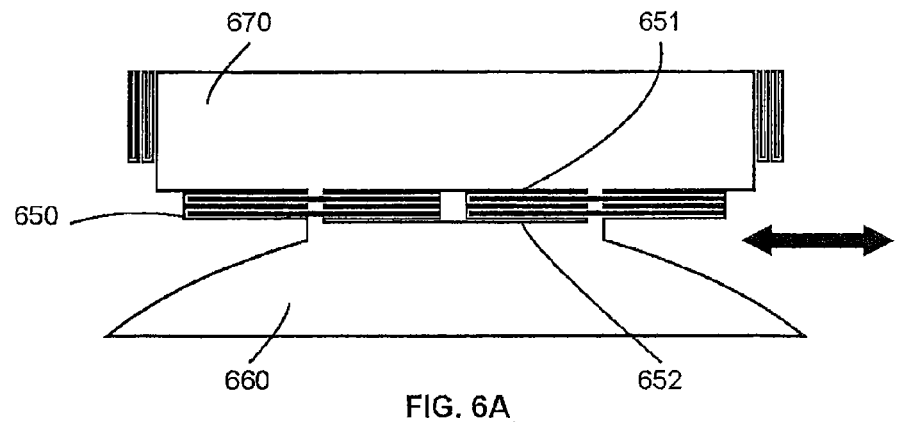
FIG. 6A
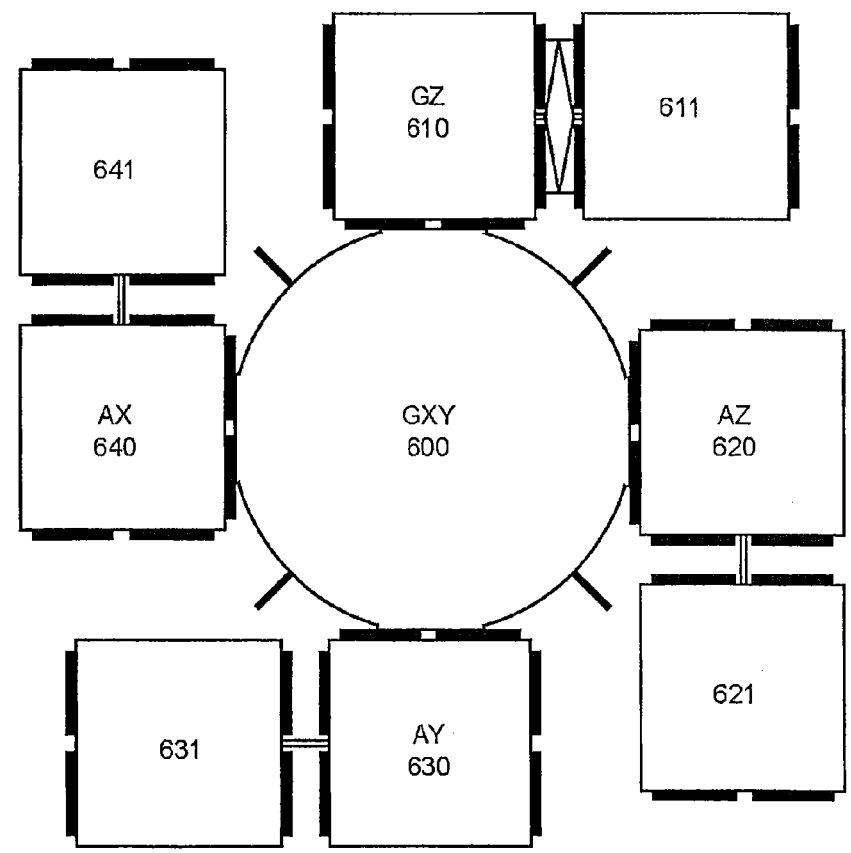
FIG. 6B
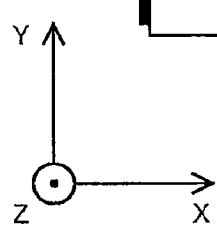

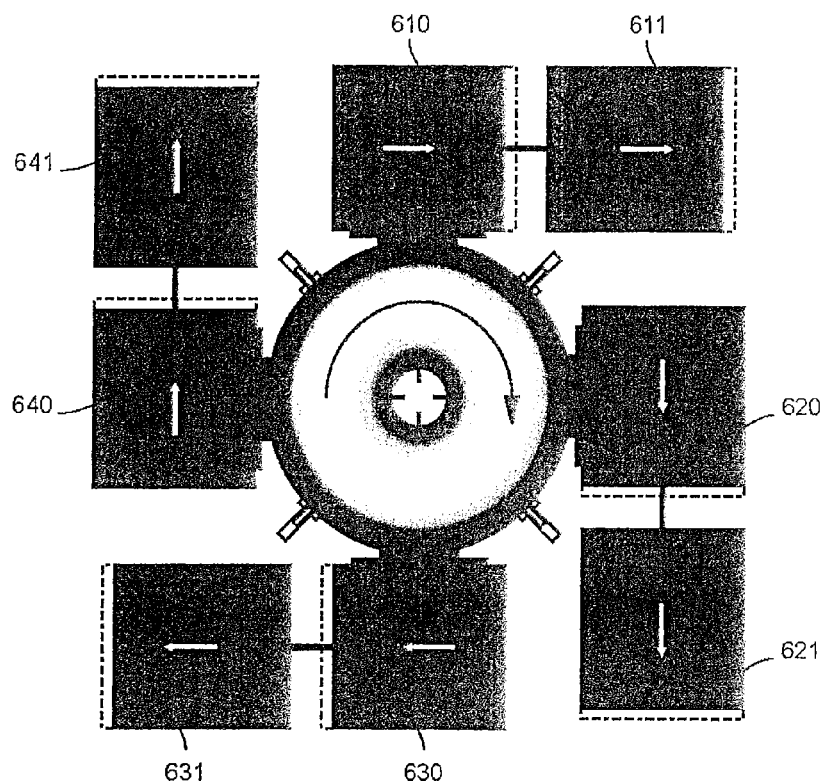
FIG. 6C
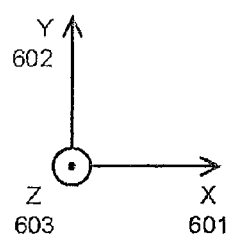

OBLON ET AL (703) 413-3000
DOCKET # 409344US41
INV. Arnaud WALTHER
USSN 13/722,427
Reply to OA DATED Sept. 17, 2014
REPLACEMENT SHEET(S)

MICRO/NANO MULTIAXIAL INERTIAL SENSOR OF MOVEMENTS

TECHNICAL FIELD

The present invention relates in general to inertial sensors of miniature multiaxial accelerometer, gyroscope or gyrometer type. In particular, it relates to multiaxial sensors manufactured in MEMS technology, capable of detecting angular velocities and linear accelerations along several axes associating accelerometers and/or gyroscopes.

PRIOR ART

The literature contains several examples of multiaxial inertial sensors manufactured in MEMS technology "Micro Electro-Mechanical Systems", by virtue of their semiconductor properties and their mechanical qualities. Starting from a substrate, the micro systems are formed in a plane and etched on the surface thereof using means and methods of microelectronic technologies, especially deposits or growth of diverse materials in multiple layers, as well as photolithography technologies to define the patterns.

In one example of structure of an inertial sensor, the sensor is provided with a fixed part such as a part of a substrate employed in the MEMS technologies. Another part, known as the mobile part, is mounted relative to the fixed part so that its freedoms of movements are preserved. The mobile part forms the portion of the sensor in which a pseudo Coriolis force is created in the case of rotation under the condition of excitation along an axis in which the said force is detected or in which an accelerating force is created along an axis in which detection takes place.

It is possible, in a given device, to juxtapose a plurality of sensors, each dedicated to the detection of a movement. Nevertheless, a need exists to improve this technology.

SUMMARY OF THE INVENTION

The present invention relates to a multiaxial inertial sensor of movements comprising:
  a first sensor; and
  a second sensor;
  wherein the inertial sensor additionally comprises a structure that is coupled in rotation around a Z axis and configured to induce transmission of movement between respectively:
    the first sensor by means of a first excitation mass having a first degree of freedom, advantageously in translation, along a first excitation axis in a plane XY perpendicular to the Z axis; and
    the second sensor by means of a second excitation mass having a second degree of freedom, advantageously in translation, along a second excitation axis of plane XY.

According to one embodiment, the invention may exhibit an aspect where the second excitation axis of the second excitation mass is different from or identical to the first excitation axis of the first excitation mass.

In this way it is possible to benefit from mutualization of means to achieve the excitation movement of a plurality of sensors.

BRIEF DESCRIPTION OF THE FIGURES

The present invention will be better illustrated by means of the detailed description of the embodiments, which may be combined and are illustrated by the following non-limitative accompanying drawings, wherein:

FIG. 2 shows a perspective view of a coupling structure of the present invention comprising an oscillating disk gyroscope equipped with a plurality of rings capable of detecting Coriolis forces by means of gauges.

FIG. 6A illustrates an example of a spring capable of connecting the excitation rings of an oscillating disk gyroscope and of an accelerometer/gyroscope with linear excitation movement.

FIG. 6B shows a block diagram of a 6-axis sensor according to the present invention with a central gyroscope sensor in rotational movement around the Z axis and with dynamic accelerometer sensors and gyroscopes in linear movement as dual masses.

FIG. 6C shows a simulation of the mode of deformation in excitation, where the central sensor has a rotational movement around the Z axis and the lateral sensors have linear movements as dual masses in several directions of the plane.

DETAILED DESCRIPTION OF EMBODIMENTS OF THE INVENTION

Figure 1:
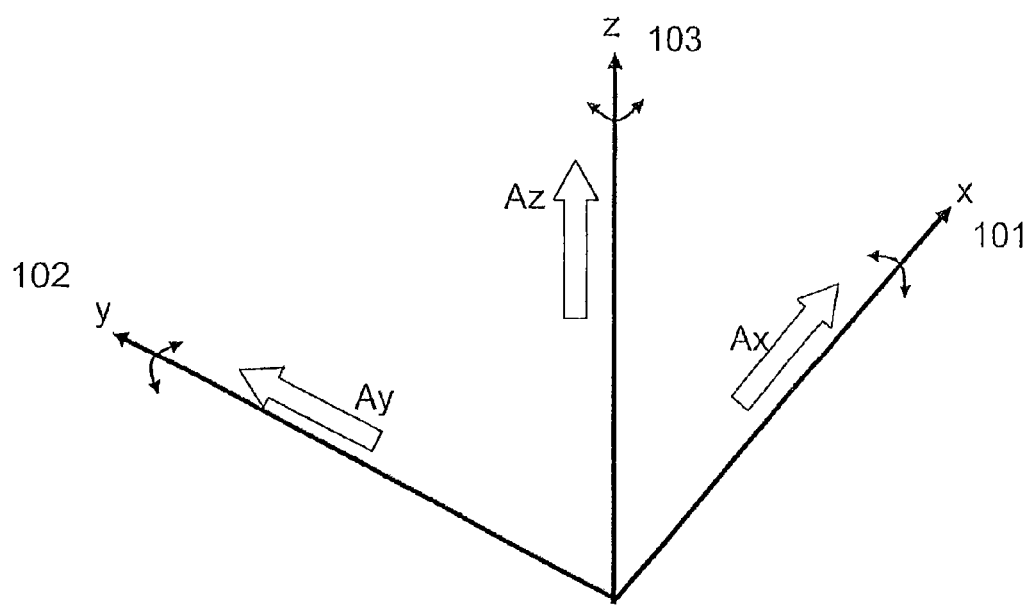
FIG. 1 shows an example of a system of orthogonal axes XYZ in which the device of the present invention can be described with respect to its functioning.

Before embodiments are presented with reference to the drawings, it is pointed out that, depending on optional embodiments, the invention may exhibit the following aspects, which may be employed alone or in any combination.

The coupling structure is provided with an oscillating element, the oscillations of which in the XY plane around the Z axis are transmitted thereto by the kinetic energy of excitation of an exciter.

The first sensor is a dynamic accelerometer comprising:
  the first excitation mass coupled with the coupling structure;

a first detection mass integral with the movement of the first excitation mass and mobile according to a direction perpendicular to the first excitation axis; and a detector configured to detect an acceleration during displacements of the first detection mass along the direction perpendicular to the first excitation axis.

The detector may comprise a transmission element (such as a transmission arm) integral with the movement of the first detection mass along the direction perpendicular to the first excitation axis but not along the first excitation axis and at least one gauge for measuring forces to which the transmission element is subjected via, for example, a bar anchored to the substrate by a pivot.

According to an embodiment alternative to the foregoing, the detector may be provided with capacitive electrodes for measuring the displacement of the transmission elements instead of with a measuring gauge.

Furthermore, the first detection mass may comprise two individual inertial masses configured to filter the movements generated by Coriolis forces in the case of rotation.

The inertial masses may be coupled so as to exhibit movements in phase along the first excitation axis.

Furthermore, the second sensor is a gyroscope comprising:
the second excitation mass coupled with the coupling structure;
a second detection mass that is mobile along a direction perpendicular to the second excitation axis; and
a detector configured to detect a Coriolis force that induces a displacement of the second detection mass along the direction perpendicular to the second excitation axis.

The detector may comprise a transmission element (such as a transmission arm) integral with the movement of the second detection mass along the direction perpendicular to the second excitation axis but not along the second excitation axis; this transmission element is anchored to the substrate by way of a pivot link (for example, a bar anchored by a pivot) and contains measuring means, which may be, without being limitative, at least one gauge for measuring forces to which the transmission element is subjected or capacitive electrodes for measuring the displacement of the transmission element.

In another embodiment, the second detection mass may comprise two individual inertial masses configured to filter the acceleration movements.

The inertial masses are coupled so as to exhibit movements in phase opposition along the second excitation axis.

In another embodiment, the oscillating element may comprise an oscillating disk gyroscope in the XY plane with one degree of freedom in rotation around the Z axis and comprising:
a central ring coupled with an outer excitation ring forming the coupling structure at least partly, the central ring having at least one degree of freedom in rotation around a first axis of the XY plane and transmitting a Coriolis force at least partly in order to measure a rotational movement around a second axis of the XY plane, perpendicular to the first axis; and wherein the outer excitation ring is coupled with the excitation masses of the first sensor and of the second sensor to transmit linear excitation movements in the XY plane to them.

The oscillating disk gyroscope in the XY plane may additionally comprise:
an intermediate ring subjected to the Coriolis force and configured to transmit a Coriolis force at least partly to the central ring without transmitting the oscillations of the outer excitation ring at least partly, in order to assure decoupling between excitation and detection.

In another embodiment, the coupling structure may be provided with at least two oscillating disks in rotation around a Z axis and coupled with one another by their circumferences.

The coupling structure may also be provided, for each of the first and second sensors, with a link configured to transform the rotational movement around the Z axis of the coupling structure into a translational movement in the XY plane.

In another embodiment, the inertial sensor may comprise an arbitrary number of additional sensors, the coupling structure being configured to induce transmission of movements with the additional sensors.

In another embodiment, the exciter may comprise:
electrodes for excitation of the first excitation mass;
electrodes for excitation of the second excitation mass; and/or
electrodes for excitation of the coupling structure.

In one embodiment, the exciter is configured to excite at least two among: the coupling structure, the first excitation mass and the second excitation mass, the exciter therein being provided with an automatic control circuit.

Within the scope of the present invention, it is desired to associate a plurality of sensors and especially at least one accelerometer and another sensor such as a gyroscope and possibly a plurality of accelerometers and gyroscopes and to make them work together, in other words in the same electronic unit. The present invention makes it possible to link at least one accelerometer with other structures, either accelerometers or gyroscopes, by a coupling structure.

It is to be noted that the mode of operation of MEMS accelerometers differs substantially from that of traditional MEMS gyroscopes. In fact, for an accelerometer, an excitation loop is not usually present and the movements in detection are at low frequency. Thus, according to the invention, in order to make the accelerometers and gyroscopes work together, it is necessary to make certain adjustments and modifications to them, such as those described in French Patent FR2957414-A1.

By producing a chip associating both gyroscopes and accelerometers, it is possible to achieve detections and measurements in up to 6 axes, in other words 3 accelerometer axes and 3 gyroscope axes, and to control the sensor by one and the same electronic unit using only a single automatic control loop in excitation and only a single reading element for all axes. It is possible that reading redundancies may result from this. Furthermore, by virtue of this device and method, it is possible to measure each axis independently of the others, and in particular to detect/distinguish rotations as well as possible from accelerations and vice versa.

To detect up to 3 axes of acceleration and rotation, several excitation directions in the substrate plane are used. Advantageously, a coupling structure is chosen that permits precisely strong coupling of the excitation movements of the different accelerometers and gyroscopes.

Such a coupling structure may be constituted by a disk rotating around the Z axis. The shape of the disk is not limitative, but preferably the single degree of freedom of this structure is in rotation around the Z axis. The coupling structure is advantageously provided with an oscillating element, which may have the form of a disk. By disk there is understood any element whose circumference is circular or is a portion of a circle (in other words corresponding to an angular sector of a complete disk). The disk may be solid or have holes, for example a central hole bounding an annular periphery. By virtue of strong coupling, this disk transmits an excitation movement in several directions of the plane to a plurality of other sensors connected to its periphery, these latter sensors using a generally linear excitation movement in the plane. These latter sensors are also provided with an excitation mass having only one degree of freedom along the excitation direction, and are connected by their excitation mass to the oscillating disk by way of a link that is rigid in the excitation direction. This link advantageously assures transformation of the rotation of the disk to a translational movement of the excitation mass. In other cases, however, the disk may transmit a rotational movement, for example to an oscillating disk gyroscope.

Without going into details, the oscillating disk coupling structure may be incorporated, at least partly, in a gyroscope known as "oscillating disk gyroscope", which has substantially disk shape, uses a movement of excitation in rotation around the Z axis and makes it possible to measure one or two axes of rotation in the substrate plane. This gyroscope is constituted by an external part known as excitation ring, which has only one degree of freedom in rotation around the Z axis and to which the excitation masses of sensors using a linear excitation movement in the plane are attached.

FIG. 1 shows an example of a system of orthogonal axes XYZ in which the device of the present invention may be described in its operation. The movements in axes X101, Y102 and Z103 are respectively denoted AX, AY and AZ. The rotations around axes X101, Y102 and Z103 are also represented by arrows.

FIG. 2 illustrates a coupling structure 200 capable of being used in a device according to the invention.

By way of example, an oscillating disk gyroscope participating both in detection and in the coupling structure is described. The gyroscope possesses an excitation ring having only one degree of freedom in rotation around a Z axis. Any other type of disk may be used, regardless of its shape, provided its structure has an axis of rotation.

In more detail, FIG. 2 shows a perspective view of a plane coupling structure of this first embodiment of the invention. Coupling structure 200 is composed of three separate seismic masses permitting detection of Coriolis forces generated along two orthogonal axes of rotation of the sensor and being situated in the plane of the substrate. The arrangement of the three masses with use of suspended piezoresistive gauges assures complete decoupling of the oscillating excitation movements of the sensor, which are not transmitted to the gauges, so that they are able to measure precisely only the compression and extension (or traction) movements to which they are subjected by the Coriolis forces resulting from rotations of the sensor around the two possible detection axes.

The different movements of the three masses of sensor 200 are described hereinafter on the basis of the traditional three-dimensional frame of reference, in which the plane of the sensor is defined here by the axes denoted X 201 and Y 202. The third dimension, out of the plane, is Z axis 203. The kinetic excitation energy is communicated to coupling structure 200 in the form of oscillations in the XY plane, around the Z axis, as indicated at reference 203. The excitation element is a first mass that receives this excitation by traditional means, an example of which is given below. In this example, the first mass has the form of an outer ring 210, also referred to as excitation ring, which is made free to oscillate in the single plane XY around the Z axis via springs 250, of which there are four in this example. Springs 250 are intended to give the first mass a single degree of freedom of movement in rotation around Z axis 203.

The oscillating excitation movement of the sensor is transmitted to intermediate ring 220, also referred to as detection ring, constituting another mass. It is rigidly connected to the outer ring via the excitation movement and therefore also has a movement around the Z axis. However, springs etched in the plane of the intermediate ring and described hereinafter endow it with two supplementary degrees of freedom of movement in oscillation around axes X 202 and Y 201.

Finally, another mass, in the form of central ring 230, can be anchored in rotation around Z and therefore cannot follow the oscillating excitation movements communicated to outer and intermediate rings 210 and 220. Therefore it can be sensitive only to the resultant movements of the Coriolis forces and for this purpose therefore has two degrees of freedom of movement in oscillation around the X and Y axes with the means described in the following figures; the movements due to the Coriolis force are transmitted by springs 290. Central ring 230 and outer ring 210, which are not free in all their movements, have anchoring points 204 on a fixed substrate, not represented in this figure. They are described and indicated more precisely hereinafter.

The strains due to the Coriolis forces are transmitted to the piezoresistive gauges, here by four beams 240 disposed on the inside periphery of central ring 230, thus forming an element for detection of oscillations around the X and Y axes at a hole 247. Gauges 242 are connected at one end to beams 240 integral with central ring 230 and are anchored at the other end to the substrate, for example the semiconductor, situated in the fixed part and to an individual contact stud permitting measurement of the electrical resistance of each gauge, which in the present case is a piezoresistive gauge.

Preferably, the thickness (in the Z direction, but preferably also the width orthogonal to the direction of the rotational movement to be detected) of the gauge or gauges is between a multiple of ten nanometers and several micrometers, for example 1 μm or 2 μm or 10 μm. An example of thickness is 40 nm for a strain gauge suspended in crystalline silicon. Preferably, the thickness e is very small compared with d (e<<d, or e<d/10 or e<d/20), where d is the distance between the oscillation axis of detection mass 230 in the direction of the rotational movement as illustrated at reference 348 in FIG. 3 and its lower plane opposite the substrate.

The advantage of this sensor is the decoupling between excitation and detection. In fact, the outer ring moves only along the excitation direction and not (or very little) along the detection direction. The excitation ring transmits all or part of the excitation movement to a 2nd ring, which also has one degree of freedom in detection and moves along this degree of freedom when it is subjected to a Coriolis force. A central ring is anchored in excitation and moves in detection in a manner integral with the 2nd ring.

Although the example hereinabove is described for double detection along X and Y, the oscillating gyroscope may also perform detection of only one axis among X and Y.

Figure 3:
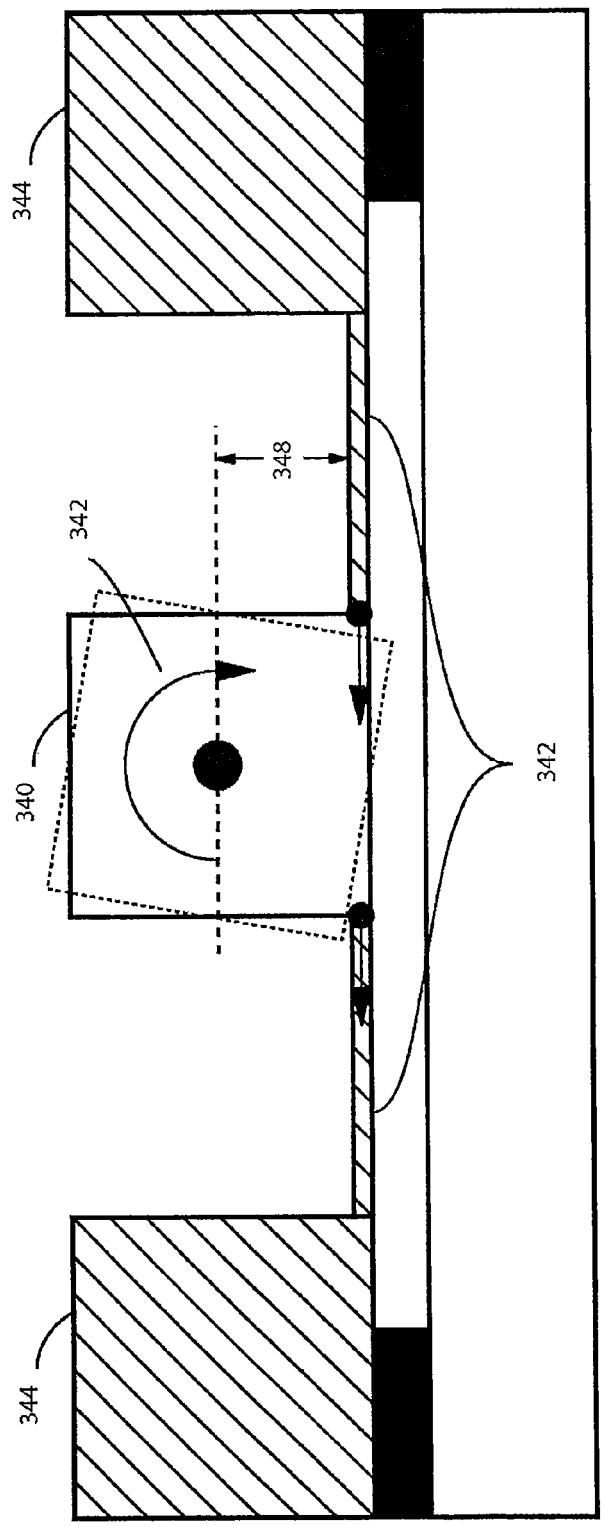
FIG. 3 illustrates a pair of piezoresistive gauges mounted in differential mode to measure the Coriolis forces oriented along the Z axis.

FIG. 3 schematically shows a pair of piezoresistive gauges 342, which are advantageously mounted in differential mode, thus making it possible to be uninfluenced by identical parasitic deformations that affect the two arms, in order to achieve a better measurement of the opposed variations of resistance due to the compression of one arm and the extension of the other by virtue of the rotation of a beam 340 under the action of Coriolis forces transmitted to central ring 230 and to beams 340. As in FIG. 2, gauges 342 are connected at one end to beams 340 integral with the central ring and are anchored at the other end to substrate 344.

Offset 348 along the Z axis relative to axis of rotation 349 of the third mass, central ring 230, produces a lever arm that amplifies the strains generated by the oscillating movements. Axis of rotation 349 is at the middle of the thick layer constituting the oscillating part. Thus, in the case of a rotation, for example around the X axis, the Coriolis force induced in the third mass generates a tensile/compressive strain on gauges 342 oriented along the X axis, due to an oscillation of the detection masses along the Y axis.

Piezoresistive gauges 342 preferably have the smallest possible cross section. Typically they have a cross section on a submicron scale, in order to achieve the highest possible strain concentration in the gauge and in this way amplify the piezoresistive effects.

As mentioned in the foregoing, it is advantageous to position gauges 342 so as to minimize the interferences between the axes of rotation, whose detection effects should ideally remain independent. When a rotation is detected, for example around X, the inertial sensor (or more precisely the detection mass or masses) oscillates around the Y axis and exerts tension/compression on the gauges associated with this detection axis. The tensile/compressive strain on these gauges causes a modification of their resistivity, which makes it possible to estimate the Coriolis force. However, during this movement, the gauges associated with detection of rotations around Y may be subjected to a vertical movement if they are not at the center of the structure (the movement is a torsional movement only if beams 340 are perfectly at the center). This vertical movement deforms them in flexion, possibly with a weak effect on the variations of resistivity of the gauge. In addition, the gauges are deformed in the same manner in flexion, although they are deformed in differential manner during detection of a rotation. It is advantageous to position them as close to the center as possible in order that this parasitic deformation in flexion:

does not compromise the integrity of the gauge, which may break in case of excessive deformation;

generates the smallest possible parasitic signal; and has the most limited effect possible on the sensitivity when it is necessary to detect components of rotation around the two axes.

Finally, gauges 342 are also preferably disposed in differential and symmetric manner relative to the axes of rotation of the detection modes. This is done so that the stiffness of gauges associated with one axis does not asymmetrically perturb the detection movement along the other axis, which would lead to coupling between modes and interference between axes.

To minimize the deformation of gauges 342 in flexion, it may be advantageous to slave the inertial sensor in detection. That does not eliminate the problem of interferences between axes, but it reduces the risks of breakage and of non-linear behavior.

Figure 4:
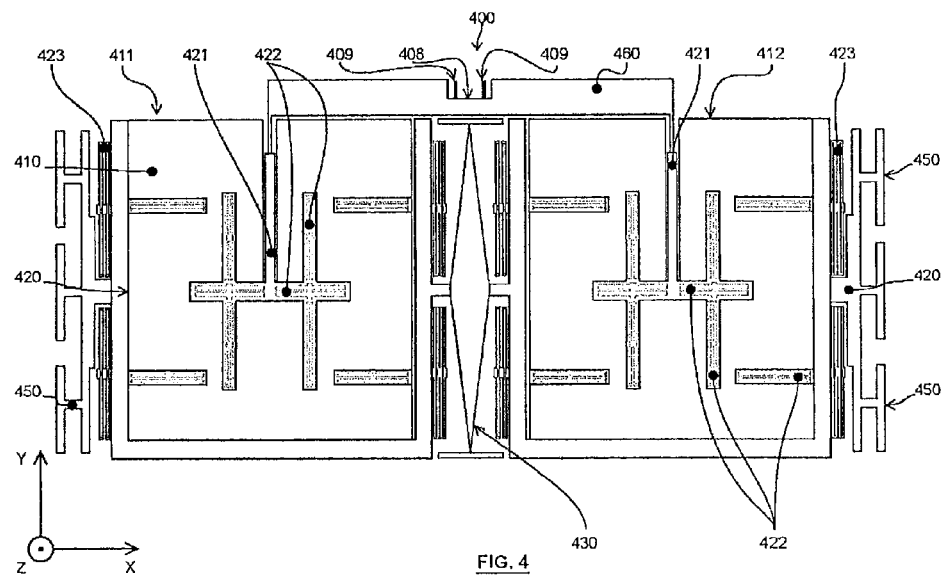
FIG. 4 illustrates a diagram of a dual-mass gyroscope structure coupled in detection by way of a bar in rotation around an axis parallel to the detection axis.

FIG. 4 shows an exemplary embodiment of a gyroscope or gyrometer sensor 400 that may be associated with the oscillating disk inertial sensor system of FIG. 2.

The sensors associated with the oscillating disk inertial sensor system may have decoupling between excitation and detection as their characteristic. In particular, they are composed of a frame or of an external mass that moves only along the excitation direction and not (or very little) along the detection direction. This frame or excitation mass transmits all or part of the excitation movement to a second frame or mass, which also has one degree of freedom in detection and moves according to this degree of freedom. Supplementary frames or masses are possible, for example a frame or a mass that is anchored in excitation and moves in detection in a manner integral with the 2nd frame/mass.

The gyroscopes may be gyroscopes of type GZ (measurement of rotation around Z, excitation along X, detection along Y or vice versa), GX (measurement of rotation around X, excitation along Y, detection along Z) or GY (measurement of rotation around Y, excitation along X, detection along Z), although in the latter two cases there would be redundancy with oscillating disk gyroscope X/Y.

So that they will be highly insensitive to parasitic stresses, these sensors may preferably but not necessarily be of "dual-mass" type, which will make it possible in each case to distinguish the signals due to accelerations from those due to rotations. The two masses of the dual-mass gyroscopes are activated in phase opposition.

In one embodiment, the detection parts of each dual-mass gyroscope are coupled. The coupling may be weak or strong. Strong coupling may be achieved, for example, by way of a rigid bar in rotation around an axis parallel to the detection axis. This type of coupling is not obligatory, but it makes it possible to reduce the sensitivity of the gyroscopes to accelerations very effectively. It is to be noted that strong coupling in detection naturally exists in the frame of oscillating disk gyroscope X/Y of FIG. 2.

An example of dual-mass gyrometer 400 is illustrated in detail in FIG. 4. Gyroscope 400 is composed of two mobile inertial masses 411 and 412 coupled by a coupling spring 430 in anti-phase. The excitation oscillation by translation along X generates a Coriolis force along Y during a rotational movement around Z.

In this example, the two mobile masses 411 and 412 are linked on the one hand by coupling spring 430 in anti-phase and on the other hand by a coupling bar 460 strong in detection in rotation around an axis parallel to the detection axis. A hinge 408 of axis Z is disposed on strong coupling bar 460. This pivot axis Z may be situated close to the center of gravity of the structure comprising the two mobile masses. Consequently, gyrometer 400 has an equilibrated structure at rest, which makes it little sensitive to the quasi-static acceleration component. A pair of piezoresistive gauges 409 is fixed on coupling bar 460 on opposite sides of hinge 408.

In another example, strong coupling bar 460 may be replaced by a weak coupling means, but in this case the sensitivity to accelerations is little reduced.

The velocity of rotation of gyrometer 400 around the Z axis is measured by the Coriolis force along Y resulting from the continuous oscillation communicated to mobile inertial masses 411 and 412 along the perpendicular axis, in other words the X axis. With each of the two mobile inertial masses 411 and 412 there is associated part of the excitation mass, for example a U-shaped excitation mass or frame 420, each surrounding a detection mass or frame 410. The two excitation masses 420 may be provided with excitation electrode supports 450 on opposite sides of the two mobile masses 411 and 412 and are linked to the substrate by way of springs 423, which may be U-shaped springs, for example.

By means of a coupling spring 430, the two excitation masses 420 urge mobile masses 411 and 412 in phase-opposition movements so that the displacement of mobile masses 411 and 412 takes place in always opposite directions along the X axis. Coupling spring 430 possesses anchoring points, which are disposed at the ends of horizontal beams linked to the corners at the top and bottom of the diamond-shaped coupling structure. The function of coupling spring 430 is to counter these displacements in the opposite directions of the two mobile inertial masses 411 and 412. The structure of anti-phase coupling spring 430 imposes movement in phase opposition upon it, explaining its name of anti-phase coupling spring. A displacement along x on one side of the diamond imposes a displacement along y on the horizontal beams fixed at their ends, and this movement along y imposes a displacement along x of opposite value on the other side of the coupling structure.

In the example of FIG. 4, the detection of displacements generated by a Coriolis force resulting from rotations around the Z axis is accomplished by way of two detection frames 421 anchored along the excitation movement and transmitting the Coriolis force generated on frame 410 to coupling bar 460. A pair of piezoresistive gauges may be fixed on coupling bar 460 on opposite sides of pivot point 408. Each of the two frames is connected to each of the two mobile inertial masses 411 and 412 by means of springs 422 arranged so as not to transmit thereto only the movements along the Y axis. Springs 422 are advantageously of the folded type. If the sensor is a single mass, a single arm 421 will be used.

In general, the invention benefits from the advantageous employment of at least one dynamic accelerometer. In this type of sensor, an excitation is transmitted to a mass forming the seismic assembly of the sensor so as to produce an oscillation that displaces the center of gravity of the seismic assembly. In this way the distance between the pivot point around which part of the sensor is mobile under the effect of a force due to the acceleration and the point of application of this force is varied. Parasitic effects in the measurement are filtered, especially the 1/f noise. Such a sensor is therefore particularly advantageous in the invention because it functions with excitation, just as for a gyrometer. The object of the excitation in this case is to modify the position of the center of gravity of the seismic assembly (excitation and detection mass here) in the course of time, with a vibratory movement of specific frequency.

Figure 5:
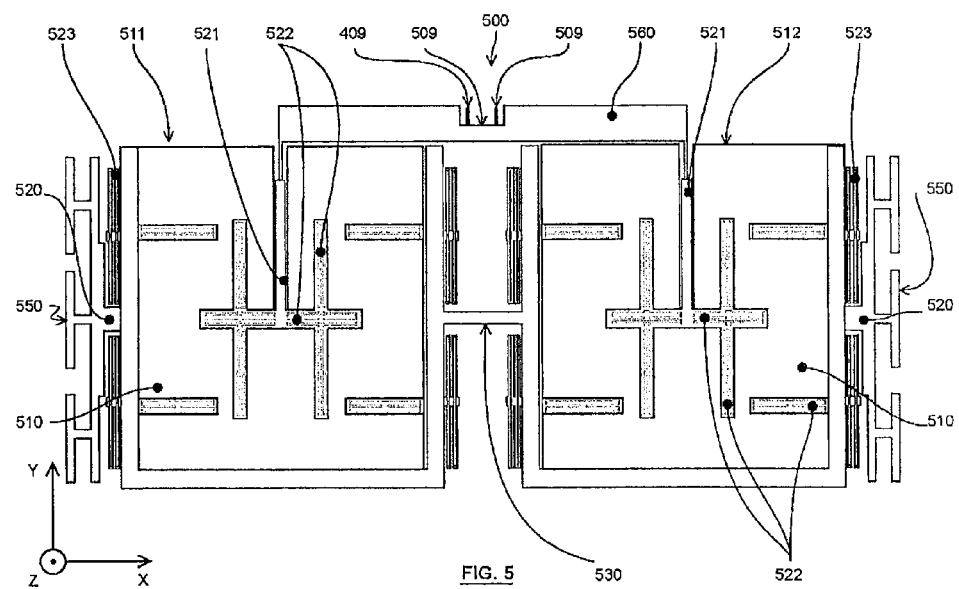
FIG. 5 illustrates a diagram of a dual-mass accelerometer structure known as dynamic coupled in detection by way of a bar in rotation around an axis orthogonal to the detection axis.

FIG. 5 represents an example of a dual-mass accelerometer 500, meaning that the accelerometer is provided with two mobile inertial masses 511 and 512.

Just as for the gyroscope sensors described in the foregoing, the accelerometer sensors associated with the oscillating disk inertial sensor system may have the characteristic of having a decoupling between excitation and detection, and in particular they are composed of a frame or of a mass, external, for example, which moves only along the excitation direction and not (or very little) along the detection direction. This excitation frame or mass transmits all or part of the excitation movement to a 2nd frame or mass, which also has one degree of freedom in detection and moves according to this degree of freedom when subjected to a Coriolis force. Supplementary frames or masses are possible, for example a frame or a mass that is anchored in excitation and moves in detection in a manner integral with the 2nd frame/mass.

So that it will be highly insensitive to parasitic stresses; the sensor may preferably but not necessarily be of "dual-mass" type, as is illustrated in this figure, which will make it possible in each case to distinguish the signals due to accelerations from those due to rotations. The two masses of the dual-mass accelerometer are activated in phase. In one embodiment, the two detection parts of each dual-mass accelerometer are coupled by way of a rigid bar in rotation around an axis orthogonal to the detection axis.

The accelerometers may be accelerometers of type AX (measurement of acceleration along X, excitation along Y, detection in rotation around Z), AY (measurement of acceleration along Y, excitation along X, detection in rotation around Z) or AZ (measurement of acceleration along Z, excitation along Y, detection in rotation around X or vice versa).

In this example, the two mobile inertial masses 511 and 512 are coupled on the one hand by a coupling spring 530 in phase and on the other hand by a coupling bar 560 strong in detection in rotation around an axis orthogonal to the detection axis. A hinge 508 of axis Z is disposed on coupling bar 560. This pivot axis Z may be situated close to the center of gravity of the structure composed of the two mobile masses. Consequently, the accelerometer has an equilibrated structure at rest, which makes it little sensitive to the quasi-static acceleration component. Thus this accelerometer has the advantage of being little influenced by the Coriolis force and by the quasi-static acceleration component. A pair of piezoresistive gauges 509 is fixed on coupling bar 560 on opposite sides of hinge 508.

Each of the two mobile inertial masses 511 and 512 comprises a U-shaped excitation mass or frame 520, each surrounding a detection mass or frame 510. The two excitation masses 520 are provided with excitation electrode supports 550 on opposite sides of the two mobile masses 511 and 512 and are linked to the substrate by way of springs 523, which may be U-shaped springs, for example. It will be seen hereinafter that the excitation may also be generated at other positions.

The two excitation masses 520 urge mobile masses 511 and 512 in movements in phase so that the displacement of mobile masses 511 and 512 takes place in the same sense in directions along the X axis. The function of coupling spring 530 is to cause the two mobile inertial masses 511 and 512 to be displaced in the same directions.

In the example of this figure, the detection of these displacements, in this case rotation around hinge 508 in the Z axis, is accomplished by way of two transmission elements 521 anchored along the excitation movement and transmitting the acceleration force generated on frame 510 to coupling bar 560. A pair of piezoresistive gauges may be fixed on coupling bar 560 on opposite sides of pivot point 508. Each of the two arms 521 is connected to each of the two mobile inertial masses 511 and 512 by means of springs 522 arranged so as to transmit thereto only the movements along the Y axis. Springs 522 are advantageously of the folded type.

Coupling bar 560 moves only in rotation around hinge 508. U-Shaped excitation masses 520 move only in excitation along the X axis. These excitation masses 520 urge detection masses 510, which move in excitation along X and in detection along Y.

In one exemplary embodiment, the accelerometer may be provided with a single mobile excitation part and/or a single detection mass.

The illustrated example of an accelerometer for measuring acceleration along Y can be transposed to dynamic measurement along other axes by making the necessary changes. Similarly, the gyrometer example of FIG. 4 can be transposed to other detection axes.

FIG. 6A illustrates an example of a spring capable of connecting the excitation rings of an oscillating disk gyroscope and of an accelerometer/gyroscope with linear excitation movement.

One type of spring 650 that may be used is the symmetric U-shaped spring, one or the other of the two sides 651, 652 being able to function as input or output. This spring assures transmission between the excitation masses of oscillating disk gyroscope 660 and the assembly of inertial masses, such as an accelerometer or a gyroscope 670, for example. The transmission may take place between an input and an output.

FIG. 6B shows a block diagram of a multiaxial and more precisely 6-axis sensor according to the invention with a central gyroscope sensor GXY in rotational movement around the Z axis, associating a plurality of dynamic accelerometer sensors AX, AY and AZ in linear movement as dual masses with a dual-mass gyroscope sensor GZ in linear movement.

In this example, the central sensor is an oscillating disk inertial sensor GXY 600 having the function of couplings associating three dynamic accelerometer sensors AX 640-

641, AY 630-631 and AZ 620-621 in linear movement as dual masses with a gyroscope sensor GZ 610-611 in linear movement as a dual mass. Mobile masses 640 and 641 of accelerometer AX are in phase, just as mobile masses 630 and 631 of accelerometer AY are in phase and also mobile masses 620 and 621 of accelerometer AZ are in phase. In contrast, mobile masses 610 and 611 of gyroscope GZ are in phase opposition, because they are coupled by a coupling spring in anti-phase represented by a diamond.

In contrast to gyroscopes GZ, oscillating disk gyroscopes GXY possess an excitation frame having only one degree of freedom in rotation around the Z axis.

The accelerometers denoted by the references AX are accelerometers in excitation along Y axis 602 and in detection in rotation around Z axis 603. Similarly, the accelerometers denoted by the references AY are accelerometers in excitation along X axis 601 and in detection in rotation around Z axis 603. Likewise the accelerometers denoted by the references AZ are accelerometers in excitation along Y axis 602 and in detection in rotation around X axis 601 or vice versa.

The gyroscopes denoted by the references GZ are gyroscopes in excitation along X axis 601 and in detection along Y axis 602 or vice versa.

FIG. 6C shows a simulation of the mode of deformation or movement in excitation, where central sensor GXY has a movement of rotation around the Z axis and the lateral sensors AX, AY, AZ and GZ have linear movements as dual masses in several directions of the XY plane.

In this example, the accelerometers and gyroscopes are the same as those of FIG. 6B. The arrows represent the sense of movements or deformation of the inertial masses of dynamic accelerometers AX 640-641, AY 630-631 and AZ 620-621 and of gyroscope sensor GZ 610-611 in linear movement as a dual mass.

Figure 7:
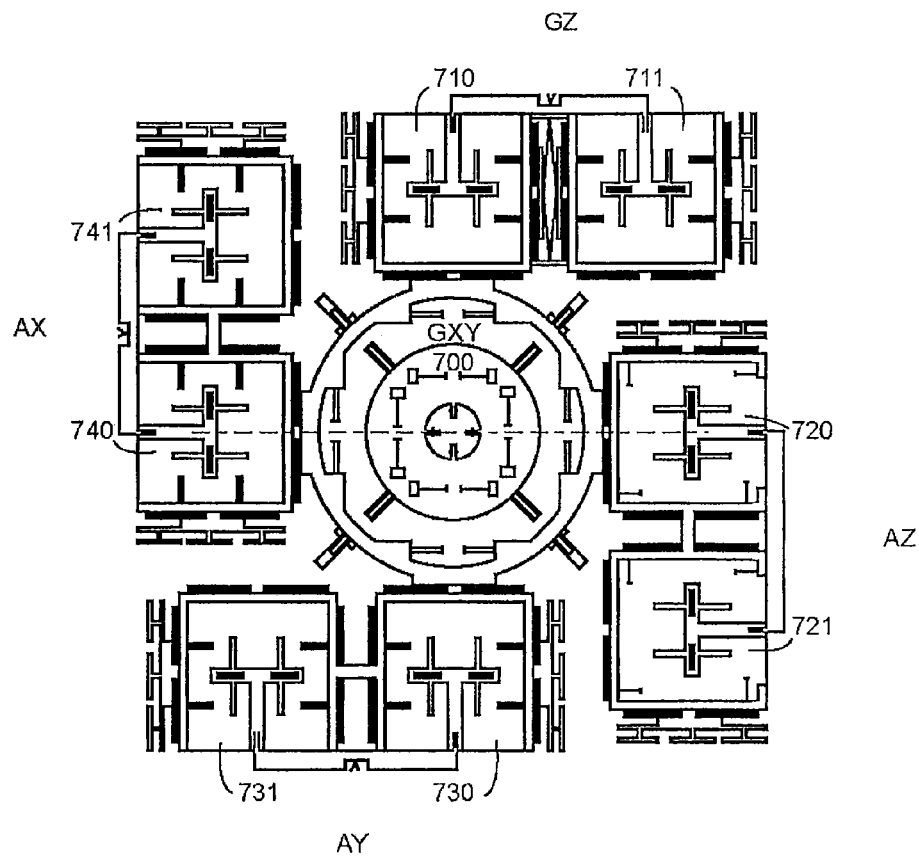
FIG. 7 shows a 6-axis sensor structure of the present invention with the detail of the mechanical structure where the couplings between masses of the dual mass are strong in excitation and in detection.
Figure 7:
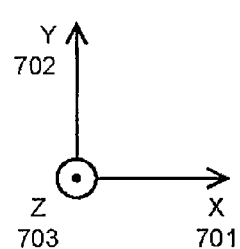

FIG. 7 shows a structure of 6-axis sensors of the present invention, with the detail of the mechanical structure where the couplings between masses of the dual masses are strong in excitation and in detection.

More specifically, this figure shows in detail the mechanical structure of linkage and coupling between the different inertial masses of dynamic accelerometers AX 740-741, AY 730-731 and AZ 720-721 of gyroscope sensor GZ 710-711 in linear movement as dual masses and with oscillating disk central gyroscope sensor GXY 700 in rotation around the Z axis.

The details described in FIGS. 3, 4 and 5 are shown here for better understanding, for example, of the detection of displacements of mobile masses by way of coupling bars in detection and can pivot as a function of movements resulting from the Coriolis force. These detections are accomplished by piezoresistive gauges, which are also represented on opposite sides of the pivot point on each of the coupling bars.

Figure 8A:
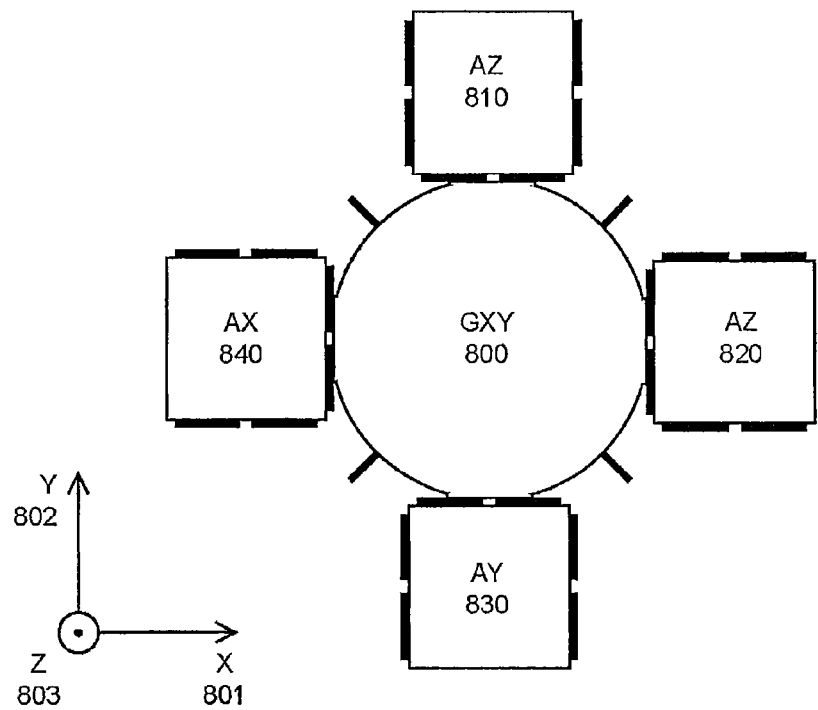
FIG. 8A shows a block diagram of a 6-axis sensor according to the present invention with a central gyroscope sensor in rotational movement around the Z axis and lateral sensors in translational movement as single masses.

FIG. 8A shows a block diagram of a 6-axis sensor according to the present invention with a central gyroscope sensor in rotational movement around the Z axis and lateral sensors in translational movement as a single mass.

This figure illustrates a simplified embodiment of FIGS. 6B, 6C and 7. The accelerometer denoted by reference AX 840 is an accelerometer in excitation along Y axis 802 and in detection in rotation around Z axis 803. Similarly, the accelerometer denoted by the reference AY 830 is an accelerometer in excitation along X axis 801 and in detection in rotation around Z axis 803. Likewise the accelerometer denoted by the reference AZ 820 is an accelerometer in excitation along Y axis 802 and in detection in rotation around X axis 801 or vice versa.

The gyroscope denoted by the reference GZ is a gyroscope in excitation along X axis 801 and in detection along Y axis 802 or vice versa.

Figure 8B:
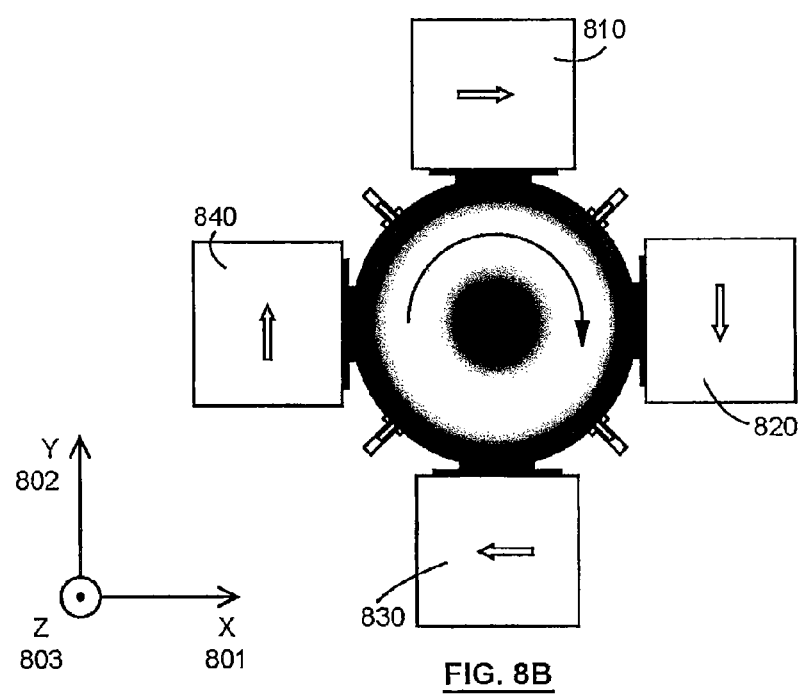
FIG. 8B shows a simulation of the natural mode of displacement in excitation, where the central sensor has rotational movement around the Z axis and the lateral sensors have linear movements in several directions of the plane.

FIG. 8B shows a simulation of FIG. 8A of the natural mode of displacement in excitation, where the central sensor has a rotational movement around the Z axis and the lateral sensors have linear movements in several directions of the plane.

In general, these directions may be mutually perpendicular according to the invention.

The arrows represent the sense of movements or deformation of the inertial masses of dynamic accelerometers AX 840, AY 830 and AZ 820 and of gyroscope sensor GZ 810 in linear movement as single masses.

Figure 9A:
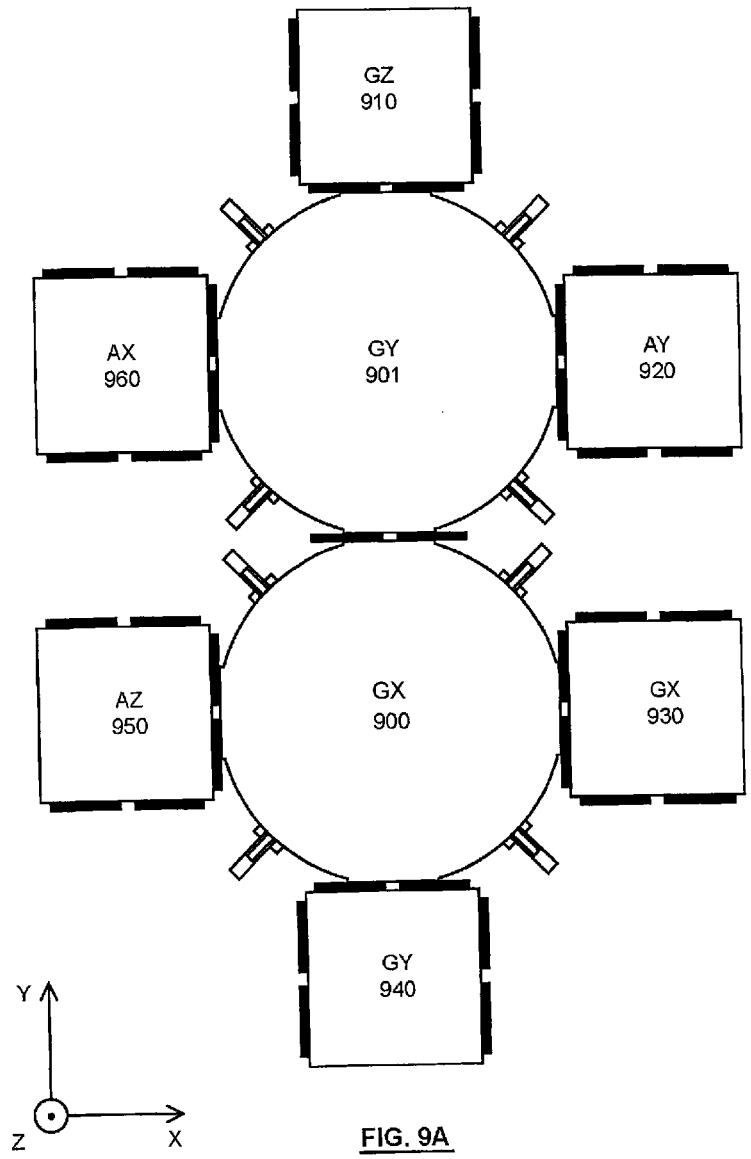
FIG. 9A shows a block diagram of a 6-axis sensor according to the present invention with sensors in translational movement as single masses in a mode of operation equipped with 2 oscillating disk gyroscopes coupled with one another.

FIG. 9A shows a block diagram of a 6-axis sensor according to the present invention with sensors in translational movement as single masses in a mode of operation in which two oscillating disk gyroscopes are coupled with one another and with the sensors.

Oscillating disk gyroscope GY 901, is, for example, a gyroscope in excitation around the Z axis and in detection around the Y axis. Gyroscope GX 900 is a gyroscope in excitation around the Z axis and in detection around the X axis. In the latter cases, there would be redundancy with peripheral gyroscopes 940, 930.

The accelerometers in this embodiment may be combinations of several types of accelerometers AX 960 (in excitation along Y, in detection in rotation around Z), AY 920 (in excitation along X, in detection in rotation around Z) or AZ 950 (in excitation along Y, in detection in rotation around X or vice versa).

Similarly, the gyroscopes in this embodiment may be combinations of gyroscopes GZ 910 (in excitation along X, in detection along Y or vice versa), gyroscopes GX 930 (in excitation along Y, in detection along Z) or GY 940 (in excitation along X, in detection along Z).

Figure 9B:
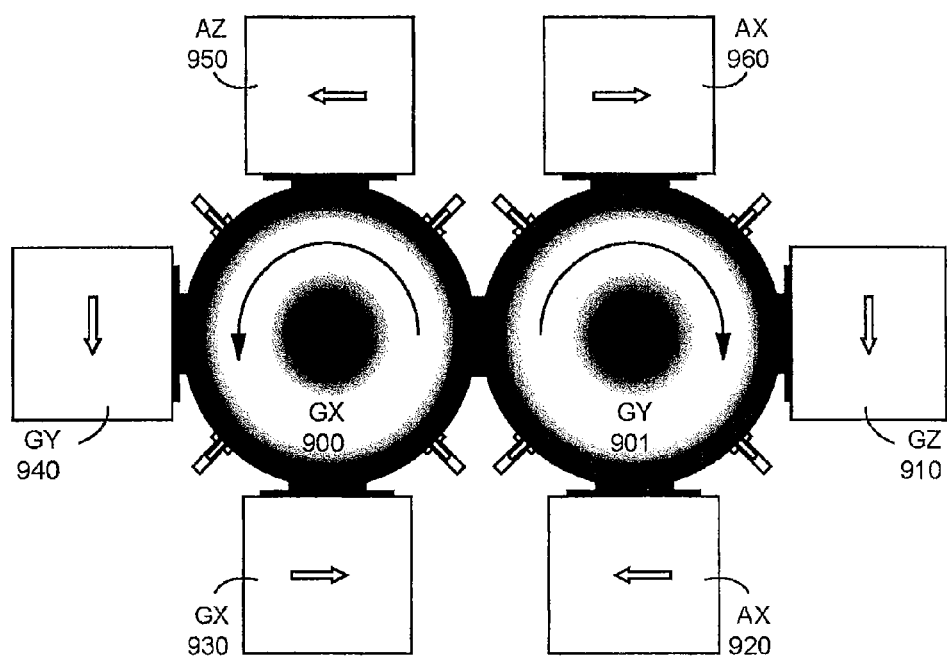
FIG. 9B shows a simulation of the natural mode of displacement in excitation, where the two central gyroscope sensors have rotational movement around the Z axis and the lateral sensors have linear movements as single masses in several directions of the plane.

FIG. 9B shows a simulation of the natural mode of displacement in excitation, where the two central gyroscope sensors have a rotational movement around the Z axis and the lateral sensors have linear movements as single masses in several directions of the plane.

In this example, the accelerometers and gyroscopes are the same as those of FIG. 9A. The arrows represent the sense of movements or deformation of the inertial masses of dynamic accelerometer sensors AX 960, AY 920, AZ 950 and of gyroscope sensors GX 930, GY 940 and GZ 910 in linear movement as single masses. These accelerometers and gyroscopes are urged by the rotational movements of the two central oscillating disk gyroscope sensors GX 900 and GY 901.

In all the examples presented hereinabove, it will be noted that the moving masses of the different sensors are substantially oriented in the plane of the substrate.

In the case of the sensor with linear excitation, it will be noted that the coupling structure assures transformation of the rotation around Z into translation of excitation axis X or Y depending on the case, and vice versa. In the case of coupling with an excitation sensor in rotation, with excitation axis around Z (gyroscope 900, 901), the link assured by the coupling structure is a transmission of rotation around the same axis.

Thus the link between sensors and coupling structures is adapted to the mode of excitation necessary for the operation of each sensor, either linear excitation or excitation in rotation around Z.

The excitation movement in this case has a globally common origin for all sensors. The excitation used to generate the excitation oscillation may be of conventional design and may comprise one or more excitation members, preferably electrostatic in the form of electrodes or interdigital fingers. A voltage is applied thereto in order to induce the displacement. Advantageously, a single command is sufficient for the entire exciter, for all sensors. The excitation members of the exciter may be placed without preference at at least one of the following locations: at the periphery of the coupling structure (in particular at the excitation ring 210), at one or more peripheral sensors. The excitation frequency may be, for example, between 1 and 30 kHz.

The chain of transmission of movement produced by the coupling structure assures excitation of all of the sensors, regardless of the location at which the excitation originated.

The advantages of the particular embodiments described according to the present invention are listed as follows:

- highly integrated sensor: capable of detecting up to 6 axes on a single chip
  - gain of surface compared with assembled sensors
  - high alignment precision compared with assembled sensors
  - the accelerometers and gyroscopes do not necessitate two different packaging pressures as is the case in the other systems (atmospheric pressure for the accelerometers, vacuum for the gyroscopes)
- possibility of being controlled by a single electronic unit, with a single excitation loop and the same electronic reading unit, both for the accelerometers and the gyroscopes (or course, an electronic reading unit may also be used for each detection axis of the device of the invention.)
- possibility of reading different axes by time multiplexing (reading of axes one after the other at a frequency substantially higher than the frequency of the excitation movement)
- reduced inter-axis ("cross axis") sensitivities, which can be easily optimized by using separate structures dedicated to the detection of each axis and the possible use of dual masses
- activation is possible by electrostatic, piezoelectric, magnetic means, etc.
- detection may be capacitive, piezoelectric, magnetic, piezoresistive, etc.; the physical principle of detection is preferably the same for all the axes of a chip
- activation may be accomplished on the excitation frame of the oscillating disk gyroscope and/or on one or more excitation frames of the accelerometers/gyroscopes having a linear excitation movement
- the accelerometers/gyroscopes with linear movement are preferably dual masses
- these dual masses preferably have strong coupling in excitation
- the coupling in excitation may be accomplished by a spring linking the two excitation frames of each dual mass
- advantageously, the direct in-phase coupling of dynamic accelerometers may be accomplished by a rigid link (in which case it may be considered that the masses of the dual mass are coincident)
- these dual masses may have coupling in detection, preferably strong, especially for the accelerometers
- the coupling of detection masses of gyroscopes may be accomplished by a rigid bar in rotation around the axis of the rotation to be detected, in order to make the gyroscopes not very sensitive at all to accelerations
- the transmission of the movement of excitation between the oscillating disk gyroscope and the accelerometers/gyroscopes with linear movement is preferably accomplished by springs that are rigid in detection of excitation and compliant in the direction orthogonal to the plane
- the number of sensors with translational movement is not specified; it may be fewer than four, but in that particular case not all the axes will be measured, or more than four, in which case redundancies will potentially exist
- the oscillating disk gyroscope may have only one detection axis (X or Y)
- a plurality of oscillating disk gyroscopes (for example, one X gyroscope and one Y gyroscope) may be linked with one another by way of their excitation frame The invention is not limited to the embodiments described but extends to all similar embodiments that exhibit the same advantages mentioned in the foregoing.

The invention claimed is:

1. A multiaxial inertial sensor of movements, comprising:
a first sensor;
a second sensor;
a coupling structure coupled in rotation around a Z axis and configured to induce transmission of movement between, respectively:
the first sensor with a first excitation mass having a first degree of freedom in translation along a first excitation axis in a plane XY perpendicular to the Z axis, and
the second sensor with a second excitation mass having a second degree of freedom in translation along a second excitation axis of the plane XY, the second excitation axis of the second excitation mass being different from the first excitation axis of the first excitation mass,
wherein the coupling structure is provided with an oscillating element, the oscillations of which in the XY plane around the Z axis are transmitted thereto by the kinetic energy of excitation of an exciter; and
an oscillating disk gyroscope in the XY plane with one degree of freedom in rotation around the Z axis and comprising:
a central ring coupled with an outer excitation ring forming the coupling structure at least partly, the central ring having at least one degree of freedom in rotation around a first axis of the XY plane and transmitting a Coriolis force at least partly in order to measure a rotational movement around a second axis of the XY plane, perpendicular to the first axis,
wherein the outer excitation ring is laterally coupled with the excitation masses of the first sensor and of the second sensor to transmit linear excitation movements in the XY plane to them.

2. The inertial sensor according to claim 1, wherein the oscillating disk gyroscope in the XY plane additionally comprises:
an intermediate ring subjected to the Coriolis force and configured to transmit a Coriolis force at least partly to the central ring without transmitting the oscillations of the outer excitation ring at least partly, in order to assure decoupling between excitation and detection.

3. The inertial sensor according to claim 2, wherein the first sensor is a dynamic accelerometer comprising:
the first excitation mass coupled with the coupling structure;
a first detection mass integral with the movement of the first excitation mass and mobile along a direction perpendicular to the first excitation axis; and
a detector configured to detect an acceleration during displacements of the first detection mass along the direction perpendicular to the first excitation axis.

4. The inertial sensor according to claim 3, wherein the detector comprises a transmission element integral with the movement of the first detection mass along the direction perpendicular to the first excitation axis but not along the first excitation axis, and a gauge for measuring forces to which the transmission element is subjected.

5. The inertial sensor according to claim 3, wherein the first detection mass comprises two individual inertial masses configured to filter the movements due to a Coriolis force resulting from a rotation.

6. The inertial sensor according to claim 5, wherein the inertial masses are coupled so as to exhibit movements in phase along the first excitation axis.

7. The inertial sensor according to claim 1, wherein the second sensor is a gyroscope comprising:
   the second excitation mass coupled with the coupling structure;
   a second detection mass mobile along a direction perpendicular to the second excitation axis; and
   a detector configured to detect a Coriolis force resulting from displacements of the second detection mass along the direction perpendicular to the second excitation axis.

8. The inertial sensor according to claim 7, wherein the detector comprises a transmission element integral with the movement of the second detection mass along the direction perpendicular to the second excitation axis but not along the second excitation axis, and at least one gauge for measuring forces to which the transmission element is subjected.

9. The inertial sensor according to claim 7, wherein the second detection mass comprises two individual inertial masses configured to filter the acceleration movements.

10. The inertial sensor according to claim 9, wherein the inertial masses are coupled so as to exhibit movements in phase opposition along the second excitation axis.

11. The inertial sensor according to claim 1, wherein the coupling structure is provided with at least two oscillating disks in rotation around a Z axis and coupled with one another by their circumferences.

12. The inertial sensor according to claim 1, comprising at least one additional sensor, the coupling structure being configured to induce transmission of movement with the additional sensor.

13. The inertial sensor according to claim 1, wherein the coupling structure is provided, for each of the first and second sensors, with a link configured to transform the rotational movement around the Z axis of the coupling structure into a translational movement in the XY plane.

14. The inertial sensor according to claim 1, comprising a single electronic circuit using a single automatic control loop in excitation and a single element for reading the first and second sensors for all axes.

15. The inertial sensor according to claim 1, wherein the exciter comprises electrodes for excitation of the first excitation mass and/or electrodes for excitation of the second excitation mass and/or electrodes for excitation of the coupling structure.

16. The inertial sensor according to claim 1, wherein the exciter is configured to excite at least two among: the coupling structure, the first excitation mass and the second excitation mass, and wherein the exciter is provided with an automatic control circuit.

* * * * *